United States Patent Office.

PHILIP FAY, SR., OF LACON, ILLINOIS.

Letters Patent No. 113,151, dated March 28, 1871.

IMPROVEMENT IN MEDICAL COMPOUNDS FOR CURE OF SCROFULA, LIVER COMPLAINT, &c.

The Schedule referred to in these Letters Patent and making part of the same.

To all whom it may concern:

Be it known that I, PHILIP FAY, Sr., of Lacon, in the county of Marshall and in the State of Illinois, have invented a Medical Compound for the Cure of Scrofula, Cancer, Liver Complaint, and cognate diseases; and do hereby declare that the following is a full, clear, and exact description of the ingredients forming this compound, the quantities of each, and manner of compounding, making, and using the same.

The ingredients and their respective quantities are as follows:

Six ounces of sarsaparilla root; six ounces of sassafras bark; six ounces of guaiacum; six ounces of antimony, (in powder;) six drams of spirits of niter; six ounces of scurvy-grass; six ounces of water-dock, leaves or roots, or both; six ounces of sheep-sorrel, roots or leaves, or both.

Throw the above, excepting the antimony, into a pot containing ten quarts of water. After boiling the above some time suspend the antimony, inclosed first in a cloth bag, in the water, having previously added to the above five quarts of water in addition, being careful to keep the bag containing the antimony from contact with the sides of the pot, if an iron one, or of other metal. Now boil the whole down to ten quarts, and, when cool, bottle for use.

The dose is one wineglassful, three times a day, until a cure is effected. The diet during its use should be Graham bread, made with lime-water, and no other solid substance whatever.

Drink may be composed of the liquid from a second boiling of the ingredients above enumerated, excepting the antimony.

Having thus described my invention,
What I claim is—

The medical compound, prepared of the ingredients, and in the proportions and manner, and to be used substantially as described.

In testimony that I claim the foregoing medical compound I have hereunto set my hand this 21st day of February, 1871.

PHILIP FAY, SEN'R.

Witnesses:
HENRY W. WELLS,
A. A. HOWARD.